US012017782B2

(12) United States Patent
Anand

(10) Patent No.: US 12,017,782 B2
(45) Date of Patent: Jun. 25, 2024

(54) AIRCRAFT ENGINE WITH STATOR HAVING VARYING PITCH

(71) Applicant: PRATT & WHITNEY CANADA CORP., Longueuil (CA)

(72) Inventor: Karan Anand, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 17 days.

(21) Appl. No.: 17/804,571

(22) Filed: May 30, 2022

(65) Prior Publication Data

US 2023/0382540 A1 Nov. 30, 2023

(51) Int. Cl.

| | |
|---|---|
| ***B64D 27/10*** | (2006.01) |
| ***F01D 5/14*** | (2006.01) |
| ***F01D 9/04*** | (2006.01) |
| ***F04D 29/54*** | (2006.01) |

(52) U.S. Cl.

CPC ............. *B64D 27/10* (2013.01); *F01D 5/142* (2013.01); *F01D 9/041* (2013.01); *F04D 29/542* (2013.01); *F04D 29/544* (2013.01); *F05D 2260/961* (2013.01)

(58) Field of Classification Search

CPC .......... F01D 9/041; F01D 5/142; F01D 5/146; F04D 29/542; F04D 29/544; F05D 2260/961; F05D 2220/3217; B64D 27/10

See application file for complete search history.

(56) References Cited

U.S. PATENT DOCUMENTS

| | | | | |
|---|---|---|---|---|
| 2,798,661 A * | 7/1957 | Willenbrock, Jr. | ....... F02C 7/04 415/209.1 |
| 3,830,058 A | 8/1974 | Ainsworth | |
| 4,791,783 A | 12/1988 | Neitzel | |

(Continued)

FOREIGN PATENT DOCUMENTS

| | | | |
|---|---|---|---|
| DE | 19525699 A1 * | 1/1997 | ............. F01D 5/142 |
| EP | 0839259 | 3/1999 | |

(Continued)

OTHER PUBLICATIONS

European Search Report dated Nov. 7, 2023 for corresponding application No. 23176107.3.

*Primary Examiner* — Topaz L. Elliott
*Assistant Examiner* — Jesse M Prager
(74) *Attorney, Agent, or Firm* — NORTON ROSE FULBRIGHT CANADA LLP

(57) ABSTRACT

An aircraft engine, has: an upstream stator having upstream stator vanes circumferentially distributed about a central axis; and a downstream stator having downstream stator vanes circumferentially distributed about the central axis, the downstream stator located downstream of the upstream stator relative to an airflow flowing within a core gaspath of the aircraft engine, a number of the upstream stator vanes being different than a number of the downstream stator vanes, major portions of leading edges of the downstream stator vanes circumferentially overlapped by the upstream stator vanes, the downstream stator vanes including: a first pair of circumferentially adjacent vanes of the downstream stator vanes spaced apart by a first pitch, and a second pair of circumferentially adjacent vanes of the downstream stator vanes spaced apart by a second pitch different than the first pitch.

16 Claims, 5 Drawing Sheets

(56) References Cited

U.S. PATENT DOCUMENTS

| | | | |
|---|---|---|---|
| 5,152,661 | A * | 10/1992 | Sheets .................. F04D 29/544 415/208.4 |
| 5,740,674 | A | 4/1998 | Beutin et al. |
| 5,984,631 | A * | 11/1999 | Tolgos .................... F01D 5/142 416/198 A |
| 6,139,259 | A | 10/2000 | Ho et al. |
| 7,743,497 | B2 | 6/2010 | Gautreau et al. |
| 8,087,253 | B2 | 1/2012 | Ning et al. |
| 8,162,603 | B2 | 4/2012 | Schilling |
| 9,482,237 | B1 | 11/2016 | Pesteil et al. |
| 9,605,540 | B2 | 3/2017 | Lin et al. |
| 9,650,915 | B2 | 5/2017 | Calza et al. |
| 9,810,082 | B2 | 11/2017 | Calza |
| 9,845,692 | B2 | 12/2017 | Jamison |
| 9,909,434 | B2 | 3/2018 | Tsifourdaris et al. |
| 10,094,223 | B2 | 10/2018 | Yu et al. |
| 10,400,606 | B2 | 9/2019 | Roche |
| 10,526,905 | B2 | 1/2020 | Estes et al. |
| 10,808,543 | B2 | 10/2020 | Grelotti et al. |
| 10,895,268 | B2 | 1/2021 | Taguchi |
| 11,073,021 | B2 | 7/2021 | Roche |
| 11,580,633 | B2 | 2/2023 | De Agostini et al. |
| 2010/0196147 | A1 | 8/2010 | Schilling |
| 2012/0328432 | A1 | 12/2012 | Ramakrishnan et al. |
| 2013/0082553 | A1 | 4/2013 | Shoji |
| 2014/0083103 | A1 | 3/2014 | Gregg et al. |
| 2014/0112769 | A1 | 4/2014 | Schoenenborn |
| 2014/0212284 | A1 | 7/2014 | Jamison et al. |
| 2015/0198047 | A1 | 7/2015 | Roche |
| 2015/0227677 | A1 | 8/2015 | Sharma et al. |
| 2016/0097281 | A1 | 4/2016 | Hanrahan |
| 2016/0146040 | A1 | 5/2016 | Simpson et al. |
| 2016/0230584 | A1 | 8/2016 | Grover |
| 2017/0114795 | A1 | 4/2017 | Englebert |
| 2017/0114802 | A1 | 4/2017 | Passrucker et al. |
| 2018/0156235 | A1* | 6/2018 | Li ......................... F04D 29/666 |
| 2018/0283189 | A1 | 10/2018 | Estes et al. |
| 2020/0063755 | A1 | 2/2020 | Taguchi |
| 2020/0123906 | A1 | 4/2020 | Roche |
| 2020/0291862 | A1 | 9/2020 | Bousfield et al. |
| 2022/0162953 | A1 | 5/2022 | Jones et al. |
| 2022/0172336 | A1 | 6/2022 | De Agostini et al. |

FOREIGN PATENT DOCUMENTS

| | | |
|---|---|---|
| EP | 2861827 | 9/2018 |
| EP | 3940200 | 1/2022 |
| GB | 2046849 | 11/1980 |

* cited by examiner

AIRCRAFT ENGINE WITH STATOR HAVING VARYING PITCH

TECHNICAL FIELD

The application relates generally to aircraft engines and, more particularly, to systems and methods used to protect airfoils of such engines from foreign object damage.

BACKGROUND

In certain operating conditions, aircraft engines, such as turbofan engines, may be subjected to foreign object damage (FOD). FOD may occur when a foreign object (e.g., ice) is ingested by the engine and damages an airfoil of a rotor or a stator. The damaged airfoil is typically impacted at its leading edge. This may result in performance loss, imbalance, and so on. Improvements are therefore sought.

SUMMARY

In one aspect, there is provided an aircraft engine, comprising: an upstream stator having upstream stator vanes circumferentially distributed about a central axis; and a downstream stator having downstream stator vanes circumferentially distributed about the central axis, the downstream stator located downstream of the upstream stator relative to an airflow flowing within a core gaspath of the aircraft engine, a number of the upstream stator vanes being different than a number of the downstream stator vanes, major portions of leading edges of the downstream stator vanes circumferentially overlapped by the upstream stator vanes, the downstream stator vanes including: a first pair of circumferentially adjacent vanes of the downstream stator vanes spaced apart by a first pitch, and a second pair of circumferentially adjacent vanes of the downstream stator vanes spaced apart by a second pitch different than the first pitch.

The aircraft engine may include any of the following features, in any combinations.

In some embodiments, the major portions of the leading edges include at least 50% of spans of the downstream stator vanes.

In some embodiments, the major portions include tip sections.

In some embodiments, the major portions are radially-outer portions.

In some embodiments, all of the downstream stator vanes are identical.

In some embodiments, the downstream stator includes baseline vane positions each associated with a respective one of the downstream stator vanes, the baseline vane positions separated from each other by a baseline pitch being constant, each vane of the first pair of circumferentially adjacent vanes of the first pair aligned with a respective one of the baseline vane positions, each vane of the second pair of circumferentially adjacent vanes being circumferentially offset from a respective one of the baseline vane positions.

In some embodiments, a ratio of the first pitch to the second pitch ranges from 1:1 to 1.10.

In some embodiments, the downstream stator includes baseline vane positions each associated with a respective one of the downstream stator vanes, a zone where major portions of baseline leading edges of the baseline vane positions are visible via spacing defined between the upstream stator vanes, the second pair of circumferentially adjacent vanes located within the zone.

In some embodiments, the zone includes a plurality of zones distributed around the central axis, the downstream stator vanes located within the zones being separated from each other by the second pitch, the downstream stator vanes located outside the zones being separated from each other by the first pitch.

In another aspect, there is provided a stator assembly, comprising: an upstream stator having upstream stator vanes circumferentially distributed about a central axis; and a downstream stator having downstream stator vanes circumferentially distributed about the central axis, the downstream stator located downstream of the upstream stator relative to an airflow flowing through the stator assembly, a number of the upstream stator vanes being different than a number of the downstream stator vanes, major portions of leading edges of the downstream stator vanes circumferentially overlapped by the upstream stator vanes, the downstream stator vanes including: a first pair of circumferentially adjacent vanes of the downstream stator vanes spaced apart by a first pitch, and a second pair of circumferentially adjacent vanes of the downstream stator vanes spaced apart by a second pitch different than the first pitch.

The stator assembly may include any of the following features, in any combinations.

In some embodiments, the major portions of the leading edges include at least 50% of spans of the downstream stator vanes.

In some embodiments, the major portions include tip sections.

In some embodiments, the major portions are radially-outer portions.

In some embodiments, all of the downstream stator vanes are identical.

In some embodiments, the downstream stator includes baseline vane positions each associated with a respective one of the downstream stator vanes, the baseline vane positions separated from each other by a baseline pitch being constant, each of the first pair of circumferentially adjacent vanes of the first pair aligned with a respective one of the baseline vane positions, each vane of the second pair of circumferentially adjacent vanes being circumferentially offset from a respective one of the baseline vane positions.

In some embodiments, a ratio of the first pitch to the second pitch ranges from 1:1 to 1:10.

In some embodiments, the downstream stator includes baseline vane positions each associated with a respective one of the downstream stator vanes, a zone where major portions of baseline leading edges of the baseline vane positions are visible via spacing defined between the upstream stator vanes, the second pair of circumferentially adjacent vanes located within the zone.

In some embodiments, the zone includes a plurality of zones distributed around the central axis, the downstream stator vanes located within the zones being separated from each other by the second pitch, the downstream stator vanes located outside the zones being separated from each other by the first pitch.

In yet another aspect, there is provided a method of manufacturing a downstream stator of a stator assembly, the stator assembly including an upstream stator and the downstream stator located downstream of the upstream stator, the method comprising: determining a circumferential position where vanes of the downstream stator would be susceptible to foreign object damage via spacing defined between vanes of the upstream stator if installed at baseline vane positions separated from each other by a first pitch being constant; outside the circumferential position, separating the downstream stator vanes by the first pitch; and within the circumferential position, separating two vanes of the downstream stator vanes by a second pitch different than the first pitch such that major portions of leading edges of the downstream stator vanes are overlapped by the upstream stator vanes.

The method may include any of the following features, in any combinations.

In some embodiments, the separating of the two vanes by the second pitch includes, for a vane of the downstream stator vanes located within the circumferential position: determining an exposure of a leading edge of the vane if the vane were installed at a corresponding baseline vane position; and determining the second pitch between the vane and a circumferentially adjacent one of the downstream stator vanes as a function of the exposure to ensure that the major portion of the leading edge of the vane is circumferentially overlapped by one of the upstream stator vanes.

BRIEF DESCRIPTION OF THE DRAWINGS

Reference is now made to the accompanying figures in which.

DETAILED DESCRIPTION

Figure 1:
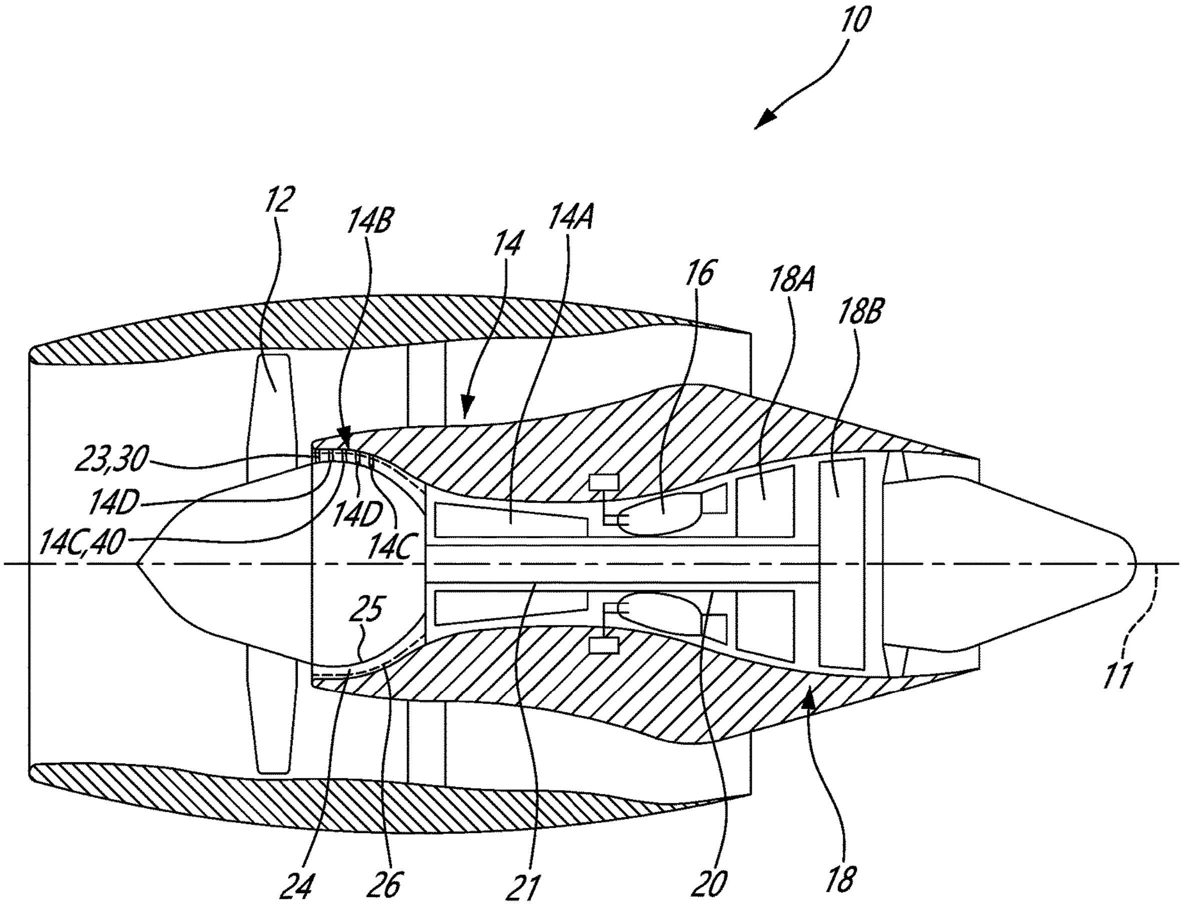
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure or power turbine 18B of the turbine section 18 to a low-pressure compressor 14B of the compressor section 14 and drivingly engaged to the fan 12.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply. The engine may have one or more spools.

Still referring to FIG. 1, in the embodiment shown, a fan stator 23 is located within a core gaspath 24 of the gas turbine engine 10. The fan stator 23 is located downstream of the fan 12 relative to a flow within the core gaspath 24. The low-pressure compressor 14B also referred to as a boost compressor, includes successive rows of stators 14C and rotors 14D. A first rotor 14D of the low-pressure compressor 14B may be located downstream of the fan stator 23 and upstream of a first stator 14C of the low-pressure compressor 14B. The first stator 14C may be the first stator the flow within the core gaspath 24 meets after it leaves the fan stator 23. The fan stator 23 and the low-pressure compressor 14B are located within the core gaspath 24, which is defined between an inner wall 25 and an outer wall 26. This core gaspath 24 is located radially inwardly of an annular gaspath that extends around an engine core. Each of the core stator 23, and the rotors 14D and stators 14C include airfoils extending through the core gaspath 24.

For the remainder of the present disclosure, the fan stator 23 will be referred to as an upstream stator 30 and the first stator 14C of the low-pressure compressor 14B will be referred to as a downstream stator 40. It will be understood that the principles of the present disclosure may apply to any combinations of two stators in serial flow communication with each other. These two stators may be located at any suitable locations along the core gaspath 24. Any pair of stators may benefit from the present disclosure.

Figure 2:
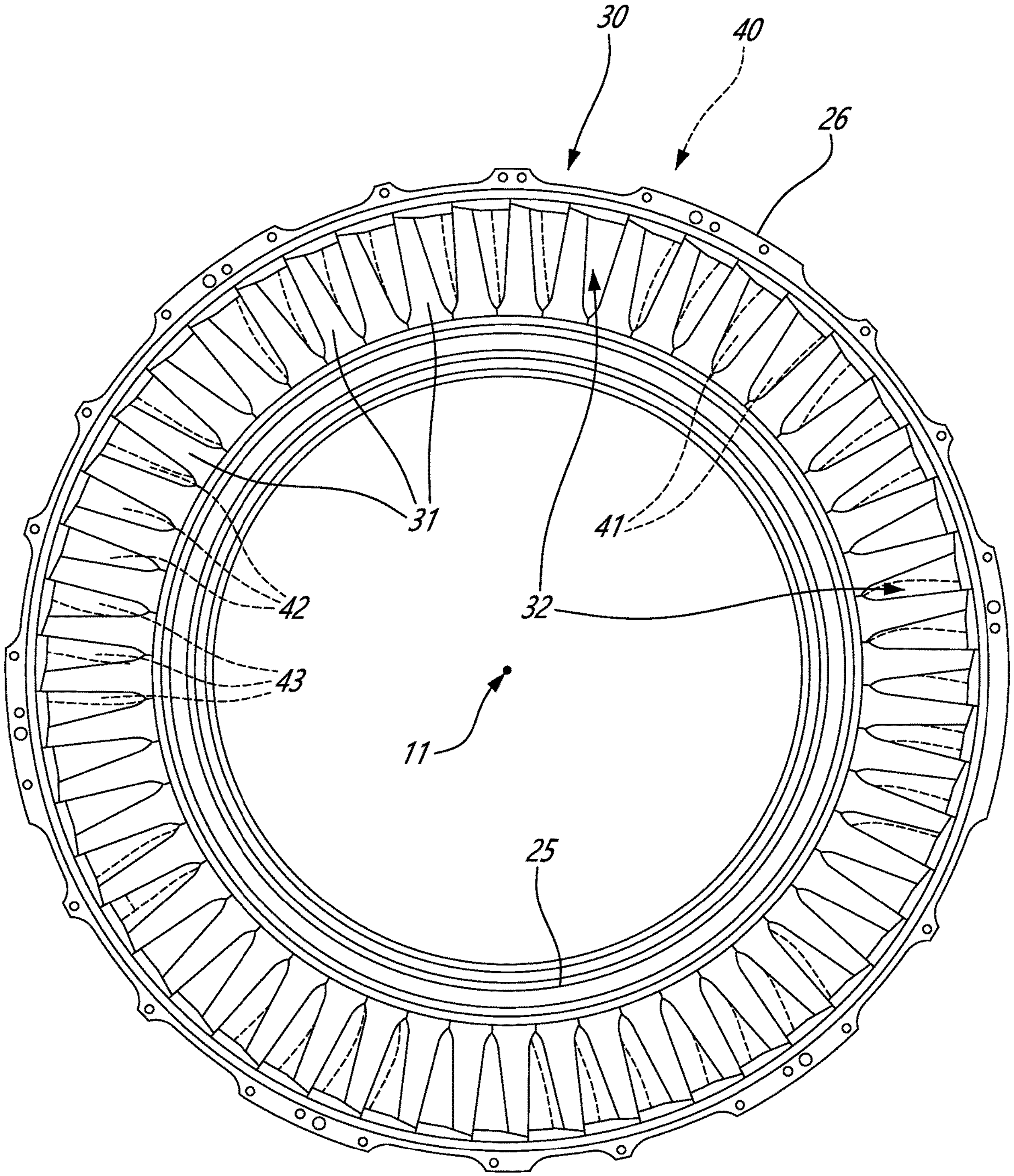
FIG. 2 is a front view of a stator assembly including an upstream stator and a downstream stator of the gas turbine engine of FIG. 1.

Referring now to FIG. 2, a front view of a section of the gas turbine engine 10 is presented and illustrates the upstream stator 30 in foreground and the downstream stator 40 in background. The upstream stator 30 includes upstream stator vanes 31 circumferentially distributed about the central axis 11. The upstream stator vanes 31 extend in a direction having a radial component relative to the central axis 11 from the inner wall 25 to the outer wall 26. The downstream stator 40 has downstream stator vanes 41 circumferentially distributed about the central axis 11. The downstream stator vanes 41 extend in a direction having a radial component relative to the central axis from the inner wall 25 to the outer wall 26. For the sake of clarity, in FIG. 2, outlines of some of the downstream stator vanes 41 visible between the upstream stator vanes 31 are shown with dashed lines. The downstream stator 40 and its downstream stator vanes 41 are located rearward of the upstream stator 30 and the upstream stator vane 31. Thus, the airflow meets the upstream stator 30 before it meets the downstream stator 40. A rotor may be disposed between the upstream and downstream stator 30, 40 but is removed from FIG. 2 for visual clarity.

A number of the upstream stator vanes 31 may be different (e.g., more, less) than a number of the downstream stator vanes 41. The number of the upstream stator vanes 31 may not be a multiple of the number of the downstream stator vanes 41 or vice-versa. Consequently, some of the downstream stator vanes 41 may be visible via spacing 32 defined between circumferentially adjacent upstream stator vanes 31. As shown in FIG. 2, some of the downstream stator vanes 41 are visible through the upstream stator 30. In other words, some of the downstream stator vanes 41 have areas visible via the spacing 32 defined between the upstream stator vanes 31. Because of the different numbers and clocking in upstream stator vanes 31 and downstream stator vanes 41, some of the downstream stator vanes 41 may be more susceptible to foreign object damage (FOD) because sensitive sections of those downstream stator vanes 41 may become exposed to FOD via the spacing 32 between the upstream stator vanes 31. In FIG. 2, the downstream stator vanes 41 located at a plurality of circumferential positions, herein, at 1 o'clock, 3 o'clock, 5 o'clock, 7 o'clock, 9 o'clock, and 11 o'clock, may be most susceptible to FOD. Circumferential positions of the downstream stator vanes 41 susceptible to FOD may vary as a function of a number of the upstream stator vanes 31 and as a function of a number of the downstream stator vanes 41 and their respective clocking.

The sensitive areas of the downstream stator vanes 41 may correspond to leading edges of the downstream stator vanes 41. In some cases, the sensitive areas may correspond to the trailing edges. The thinner areas of the airfoils may correspond to the sensitive areas. More specifically, tip sections of the leading edges of the downstream stator vanes 41 may be particularly prone to FOD. Herein, the expression tip sections of the leading edges may include a radially-outer 50% of a span of the leading edges of the downstream stator vanes 41. In some cases, the tip sections includes a radially-outer 40%, or a radially-outer 30% in some cases, of the span. In some cases, the outer section of the span may include from 40% to 50% of the span. It may include all of the span in some cases. In some embodiments, base sections of the downstream stator vanes 41 may be the sensitive areas; the base sections extending from 0% to 50% span from the radially-inner ends. In some other cases, the tip sections includes a radially-outer 20% of the span. The tip sections of the leading edges of the downstream stator vanes 41 may be more sensitive to FOD because the downstream stator vanes 41 may decrease in both chord and thickness towards tips of the downstream stator vanes 41. This, in turn, may result in the tip sections of the downstream stator vanes 41 less stiff than a remainder of the downstream stator vanes 41 and, consequently, more susceptible to FOD. In some embodiments, the thickness distribution of the vane is constant along their spans. In the embodiment shown, the exposed part of the vanes is increasing from inner ends to outer ends. In this case, for the lower part, only small ice pellet may impact. For the higher part bigger ice pellets may impact. Small ice pellets may have less energy and may make less damage than bigger ice pellets closer to the tip. This may be engine-dependent. Some engine will fly at low speed and may be susceptible to FOD near the tip. Some other engine will fly much faster and may be susceptible to FOD closer to the radially inner ends of the vane. Small ice pellet at high speed might cause more damage than big pellets at low speed.

Still referring to FIG. 2, the downstream stator vanes 41 may be divided in two groups: a first group including first vanes and a second group include at least a second vane. Major portions of leading edges of the first vanes may be circumferentially overlapped by the upstream stator vanes 31. That is, the major portions of the leading edges of the first vanes may be not visible when looking in a direction parallel to the central axis 11 and parallel to a direction of an air flow flowing through the gas turbine engine 10. The first vanes may be substantially shielded or protected against FOD by the upstream stator vanes 31. In other words, major portions of the first vanes may not be visible via the spacing 32 defined between the upstream stator vanes 31. In some embodiments, major portions of leading edges of the first vanes may not be visible via the spacing 32 defined between the upstream stator vanes 31. Herein, the expression "major portions" may include 50% or more of a span starting from radially-outer ends. In some embodiments, major portions include 80%, 90%, or 100% of the span of the vane. In some embodiments, tip sections of the leading edges of the first vanes may not be visible via the spacing 32. The tip sections may include an outer 25% of the span of the vane. Since the first vanes of the downstream stator vanes 41 have their leading edges substantially overlapped, and thus covered, by the upstream stator vanes 31, they may be less susceptible of being impacted by a foreign object. The first vanes of the downstream stator vanes 41 are labelled with reference numeral 42 in FIG. 2. The at least second vane of the downstream stator vanes 41 is mostly exposed to FOD because major portions (e.g., 50% or more) of radially-outer sections of their leading edges, or their tip sections, is visible via the spacing 32 defined between the upstream stator vanes 31. The second vane of the downstream stator vanes 41 is labelled with reference numeral 43 in FIG. 2.

Still referring to FIG. 2, each of the downstream stator vanes 41 may be thin at its leading edge and increase to a maximum thickness along a chord before tapering back down towards its trailing edge. A downstream stator vane 41 may be considered at risk of FOD if the downstream stator vane 41 is exposed (e.g., visible within one of the spacing 32 between two upstream stator vanes 31) anywhere along the chord from its leading edge to a location of maximum thickness. In other words, the major portions of the leading edges may correspond to leading edge sections extending along chords of the downstream stator vanes 41 from the leading edges to locations of maximum thickness. The leading edge sections at spanwise locations closer to tips of the downstream stator vanes 41, for instance at the tip sections of the downstream stator vanes 41, may be more prone to FOD. Hence, the downstream stator vanes 41 having their leading edge sections along their tip sections (e.g., outer 25% of their span) exposed within the spacing 32 may be susceptible to FOD and may be considered a second vane 43.

In the embodiment shown, to at least partially alleviate the risk of FOD of the second vanes 43, the pitch between the downstream stator vanes 41 may be varied such that the downstream stator vanes that would otherwise be exposed to FOD are now shielded by the upstream stator vanes 31.

Figure 3:
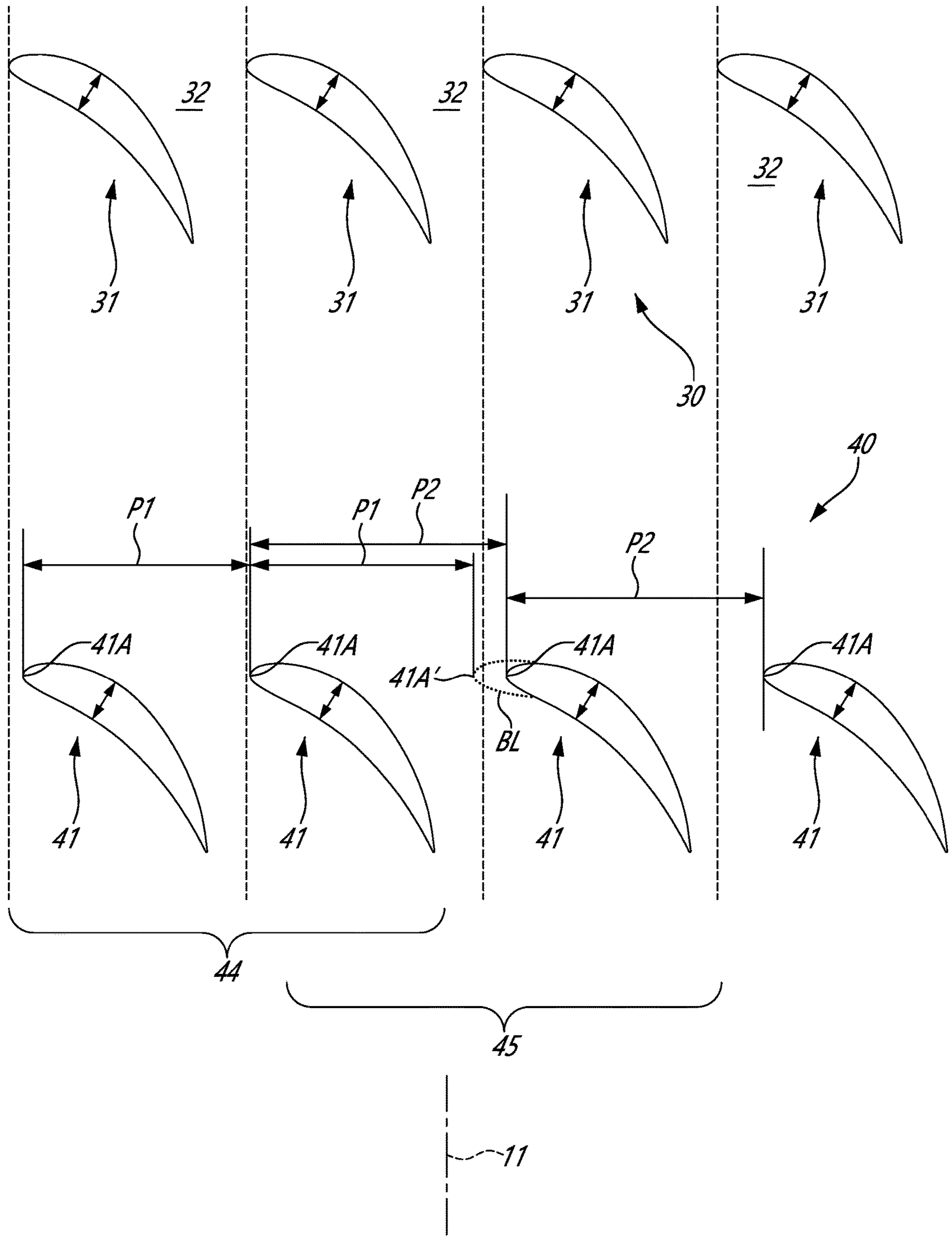
FIG. 3 is a schematic cross-sectional view illustrating vanes of the upstream stator and vanes of the downstream stator.

Referring now to FIG. 3, a cross-sectional view illustrating some of the upstream stator vanes 31 and some of the downstream stator vanes 41 is shown. This cross-sectional view may be taken at 75% span from the inner wall 25. However, a similar image may be obtained along a major portion of the span. For the sake of clarity, a rotor that may be disposed axially between the upstream and downstream stator vanes 31, 41 relative to the central axis 11 has been removed from FIG. 3, but may be present in some embodiments.

As illustrated in FIG. 3, the downstream stator vanes 41 include a first pair 44 of two circumferentially adjacent downstream stator vanes 41 and a second pair 45 of two circumferentially adjacent downstream stator vanes 41. The same downstream stator vane 41 may belong to two different pairs. The vanes 41 of the first pair 44 are spaced apart from one another by a first pitch P1. In the context of the present disclosure, the expression "pitch" corresponds to a distance taken along a circumferential direction between a leading edge of a vane, for instance a leading edge 41A of one of the downstream stator vanes 41 of the first pair 44, and a leading edge of a circumferentially adjacent vane, for instance the leading edge 41A the other of the downstream stator vanes 41 of the first pair 44. This distance is taken at the same spanwise position. For instance, the pitch may be the distance connecting the leading edge of a vane at a given location along a span of the vane and the leading edge of an adjacent vane at the given location along the span. The expression "adjacent" implies that there is no other vanes between two circumferentially adjacent vanes.

As shown in FIG. 3, the two vanes 41 of the first pair 44 have major portions of their leading edges 41A circumferentially overlapped, and thus protected from FOD, by the upstream stator vanes 31. Because of the different numbers of upstream stator vanes 31 and downstream stator vanes 41, some of the downstream stator vanes 41 could have major portions of their leading edges 41A exposed to FOD via the spacing 32 defines between the upstream stator vanes 31 if they were located at their baseline locations. For instance, the baseline location BL of a first one of the vanes 41 of the second pair 45 (on the left) is shown in dashed lines in FIG. 3 and shows that if a downstream stator vane 41 were located at this baseline location BL, its leading edge 41A would be visible via one of the spacing 32 between the upstream stator vanes 31. This vane might thus be susceptible to FOD. To alleviate this, the first one of the vanes 41 of the second pair 45 is located offset from its baseline location BL. The two vanes 41 of the second pair 45 are separated from one another by a second pitch P2, which is herein greater than the first pitch P1. In some cases, the second pitch P2 may be less than the first pitch P1. By separating the two vanes 41 of the second pair 45 by the second pitch P2 being greater (or smaller in other embodiments) than the first pitch P1, the vanes 41 of the second pair 45 have major portions of their leading edges 41A circumferentially overlapped by the upstream stator vanes 31. A ratio of the first pitch to the second pitch may range from 0.45 to 0.55. This ratio can be from 1:1 to 1:10 or higher.

The downstream stator vanes 41 may all be identical whether they belong to the first pair 44 or the second pair 45. In other words, the downstream stator vanes 41 may all have airfoils having the same geometry (e.g., camber, stagger, chord, span, curvature, etc) and made of the same material (e.g., aluminum).

As shown in FIG. 3, the downstream stator vanes 41 may include a plurality of first groups of the downstream stator vanes separated by the first pitch P1 and a plurality of second groups of the downstream stator vanes separated by the second pitch P2. The second groups may be circumferentially interspaced between the first groups. The second groups may be located at the locations of high risk of FOD as explained above with reference to FIG. 2. It will be appreciated that the pitch between the downstream stator vanes 41 may be continuously varied all around the central axis 11. That is, each pair of the downstream stator vanes 41 may have its respective pitch different than the pitches of the other pairs of the downstream stator vanes 41. All of the downstream stator vanes 41 located at zones not at risk of FOD may be spaced apart from each other by the first pitch P1 whereas the pitches that separate the downstream stator vanes 41 located within zones of high FOD risk may be non-uniform and selected to ensure that the major portions of the leading edges 41A of each of the downstream stator vanes 41 located within the zones of high FOD risks are circumferentially overlapped by a respective one of the upstream stator vanes 31.

Each of the downstream stator vanes 41 may be associated with a baseline vane position BL. The baseline vane positions are separated from each other by a baseline pitch being constant. This baseline pitch may correspond to the first pitch P1. Each of the downstream stator vanes of the first pair 44 is aligned with a respective one of the baseline vane positions. At least one of the vanes 41 of the second pair 45 is circumferentially offset from a respective one of the baseline vane positions.

Stated differently, the downstream stator 40 has a zone where major portions of baseline leading edges 41A' of the baseline vane positions BL are visible via the spacing 32 defined between the upstream stator vanes 31. The second pair 45 of the downstream stator vanes 41 may be located within this zone. As shown in FIG. 2, this zone may include a plurality of zones distributed around the central axis 11. The downstream stator vanes 41 located within the zones may be separated from each other by the second pitch P2 whereas the downstream stator vanes 41 located outside the zones may be separated from each other by the first pitch P1.

In some embodiments, the downstream stator 40 may be a segmented ring including a plurality of segments circumferentially distributed about the central axis 11. First segments of the plurality of segments may include downstream stator vanes 41 separated from one another by the first pitch P1. Second segments of the plurality of segments may include downstream stator vanes 41 separated from one another by the second pitch P2, or by many different pitches. The first segments may be located between (i.e., outside) the zones of high FOD risk whereas the second segments may be located within the zones of high FOD risk.

Figure 4:
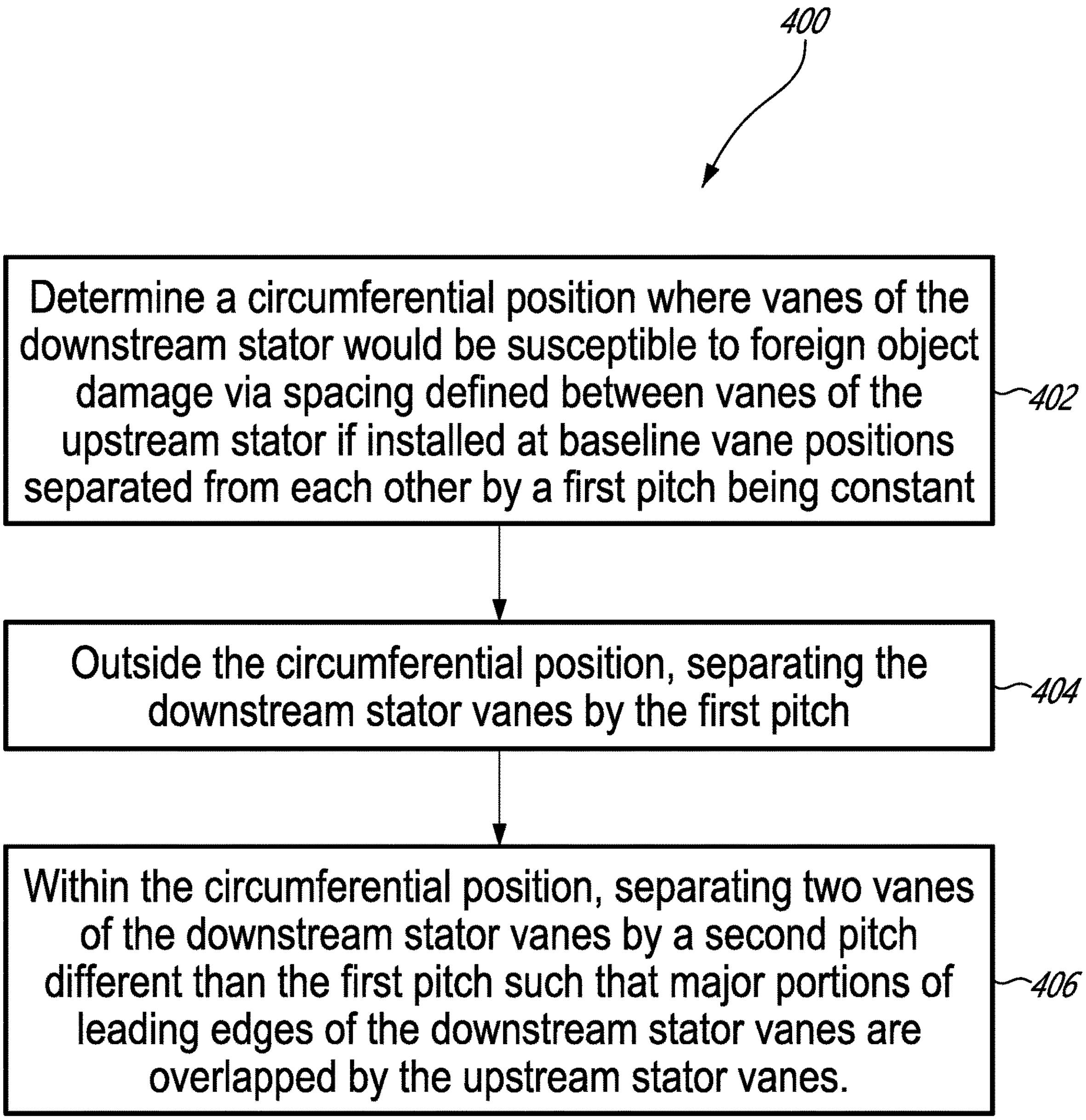
FIG. 4 is a flowchart illustrating steps of a method of manufacturing the downstream stator for the aircraft engine of FIG. 1.

Referring now to FIG. 4, a method of manufacturing the downstream stator 40 is shown at 400 and includes: determining a circumferential position where the downstream stator vanes 41 of the downstream stator 40 would be susceptible to foreign object damage via the spacing 32 defined between the upstream stator vanes 31 of the upstream stator 30 if installed at the baseline vane positions BL separated from each other by a baseline pitch being constant at 402; outside the circumferential position, separating the downstream stator vanes 41 by the first pitch P1 at 404; and within the circumferential position, separating two vanes 41 of the downstream stator vanes 41 by the second pitch P2 different than the first pitch P1 such that major portions of the leading edges 41A of the downstream stator vanes 41 are overlapped by the upstream stator vanes 31 at 406.

In some embodiments, the separating of the two vanes by the second pitch at 406 includes, for a vane 41 of the downstream stator vanes 41 located within the circumferential position: determining an exposure of the leading edge 41A of the vane 41 if the vane were installed at a corresponding baseline vane position BL; and determining the second pitch P2 between the vane 41 and a circumferentially adjacent one of the downstream stator vanes 41 as a function of the exposure to ensure that the major portion of the leading edge 41A of the vane 41 is circumferentially overlapped by one of the upstream stator vanes 31.

Figure 5:
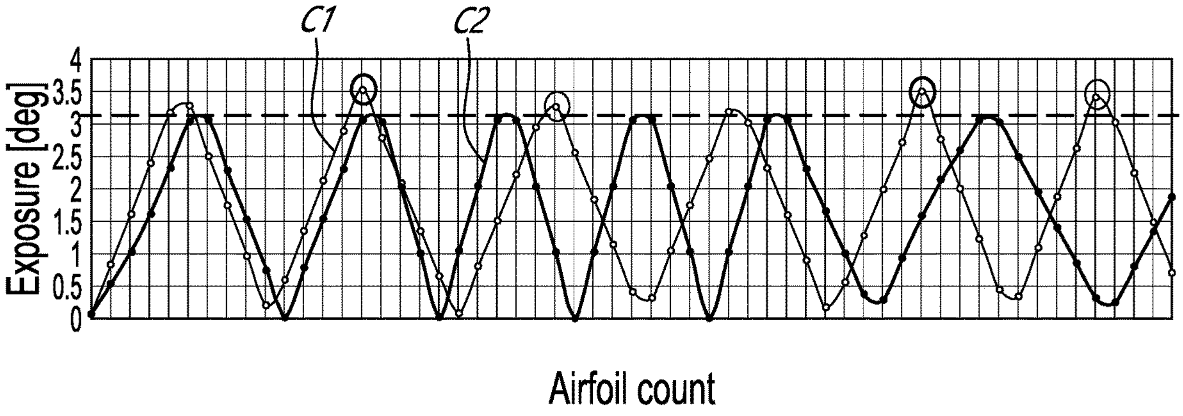
FIG. 5 is graph illustrating exposure of downstream stator vanes of the downstream stator.

The determining of the exposure may be done by plotting a graph as shown in FIG. 5. This graph illustrates a first curve C1 showing exposure, in degrees, for each of the downstream stator vanes 41 if they were each aligned with a respective baseline vane position BL. The second curve C2 shows the exposure after the pitch has been modified such that some or all of the vanes are offset from their baseline vane position. In the present embodiments, each vanes showing an exposure above 3 degrees may be susceptible to FOD. These vanes may be then offset from their baseline vane position to decrease their exposure and protect them against FOD.

Figure 6:
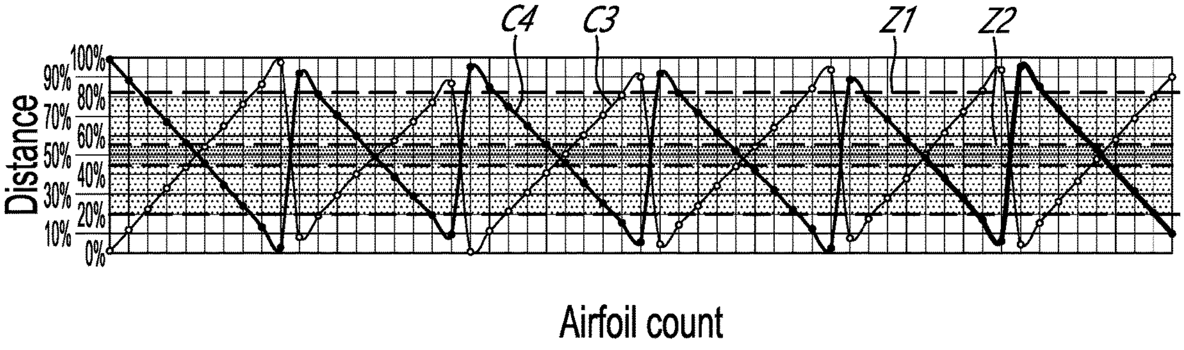
FIG. 6 is a graph illustrating circumferential distances between the downstream stator vanes and neighbouring upstream stator vanes of the upstream stator.

Referring to FIG. 6, another graph illustrating tangential or circumferential distances between each of the downstream stator vanes 41 and neighbouring upstream stator vanes 31 is shown. To plot curve C3 on FIG. 6, a clockwise circumferential distance is calculated between each of the downstream stator vanes 41 and a corresponding nearest one of the upstream stator vanes 31. To plot curve C4, a counter-clockwise circumferential distance is calculated between each of the downstream stator vanes 41 and a corresponding nearest one of the upstream stator vanes 31. For instance, for airfoil 1 of the downstream stator vanes 41, the nearest upstream stator vane is at about 1% away in the clockwise direction (curve C3) and at about 99% away in the counter clockwise direction (curve C4). For airfoil 2, the upstream stator is at about 12% away in clockwise direction and at about 88% away in the counter clockwise direction and so on. These percentages are percentages of an upstream pitch of the upstream stator 30.

The graph in FIG. 6 may be generated by taking a radial or sectional cut at a given spanwise location, which may be selected to intersect weakest areas of the downstream stator vanes most susceptible to FOD. For instance, in this case, it was at about 75% span. The radial location may intersect the upstream stator 30 as well; if it does not, then a streamline should be used.

Still referring to FIG. 6, the graph shows a first zone Z1 where the downstream stator vanes 41 have some portions exposed via the spacing 32, and second zone Z2 where critical portions of the downstream stator vanes 41 are exposed via the spacing as they are substantially halfway between the upstream stator vanes 31. These critical portions may correspond to the major portions of the leading edges 41A as explained above. As shown in FIG. 6, each of the downstream stator vanes 41 that is circumferentially distanced from its neighbouring upstream stator vanes 31 by from about 45% to about 55% should be moved offset of its baseline vane position by changing its pitch to protect it from FOD. This implies that the downstream stator vane 41 is substantially centered between two of the upstream stator vanes 31 and, thus, mostly exposed to FOD. The graph of FIG. 6 may be generated as part of the method 400 for determining which of the downstream stator vanes 41 are susceptible to FOD.

In some embodiments, the upstream stator vanes 31 may have non-constant pitch to protect the downstream stator vanes 41. Both of the upstream and downstream stator vanes 31, 41 may be disposed at different pitches to shield the downstream stator vanes 41 from FOD. In other words, the upstream stator vanes 31 may be distributed at different pitches to help protect the downstream stator vanes 41 from FOD.

By changing the pitch of the exposed airfoils or optimizing the overall configuration, the exposure may be reduced, and overall high-performance thinner airfoils may be used all around the downstream stator 40. With this change in pitch, it may not be required to redesign any of the vanes 41. The different pitches may help in mistuning dynamic excitation of the rotors disposed between the upstream and downstream stators.

Herein, the expression "about" implies variations of plus or minus 10%.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:

an upstream stator having upstream stator vanes circumferentially distributed about a central axis; and a downstream stator having downstream stator vanes circumferentially distributed about the central axis, the downstream stator located downstream of the upstream stator relative to an airflow flowing within a core gaspath of the aircraft engine, a number of the upstream stator vanes being different than a number of the downstream stator vanes, major portions of leading edges of the downstream stator vanes circumferentially overlapped by the upstream stator vanes, the downstream stator vanes including:

a first pair of circumferentially adjacent vanes of the downstream stator vanes spaced apart by a first pitch, the first pair of the circumferentially adjacent vanes including a first vane and a second vane, and a second pair of circumferentially adjacent vanes of the downstream stator vanes spaced apart by a second pitch different than the first pitch, the second pair of the circumferentially adjacent vanes including the second vane and a third vane, the second vane located between the first vane and the third vane, the third vane having a baseline position spaced apart from the second vane by the first pitch, wherein a major portion of a leading edge of the third vane, if located at the baseline position, is visible via a spacing defined between two of the upstream stator vanes when looking in a direction parallel to the central axis, wherein the third vane is circumferentially offset from the baseline position such that the major portion of the leading edge of the third vane is circumferentially overlapped by one of the upstream stator vanes, and wherein circumferential overlaps defined between the upstream stator vanes and leading edges of the downstream stator vanes are non-uniform around the central axis.

2. The aircraft engine of claim 1, wherein the major portions of the leading edges include at least 50% of spans of the downstream stator vanes.

3. The aircraft engine of claim 2, wherein the major portions include tip sections.

4. The aircraft engine of claim 2, wherein the major portions are radially-outer portions.

5. The aircraft engine of claim 1, wherein all of the downstream stator vanes are identical.

6. The aircraft engine of claim 1, wherein a ratio of the first pitch to the second pitch ranges from 1:1 to 1:10.

7. The aircraft engine of claim 1, wherein the downstream stator includes baseline vane positions each associated with a respective one of the downstream stator vanes, the downstream stator including zones where major portions of baseline leading edges of the baseline vane positions are visible via spacing defined between the upstream stator vanes, the zones non-uniformly circumferentially distributed around the central axis.

8. The aircraft engine of claim 7, wherein the downstream stator vanes located within the zones are separated from each other by the second pitch, the downstream stator vanes located outside the zones being separated from each other by the first pitch.

9. A stator assembly, comprising:

an upstream stator having upstream stator vanes circumferentially distributed about a central axis; and a downstream stator having downstream stator vanes circumferentially distributed about the central axis, the downstream stator located downstream of the upstream stator relative to an airflow flowing through the stator assembly, a number of the upstream stator vanes being different than a number of the downstream stator vanes, major portions of leading edges of the downstream stator vanes circumferentially overlapped by the upstream stator vanes, the downstream stator vanes including:

a first pair of circumferentially adjacent vanes of the downstream stator vanes spaced apart by a first pitch, the first pair of the circumferentially adjacent vanes including a first vane and a second vane, and a second pair of circumferentially adjacent vanes of the downstream stator vanes spaced apart by a second pitch different than the first pitch, the second pair of the circumferentially adjacent vanes including the second vane and a third vane, the second vane located between the first vane and the third vane, the third vane having a baseline position spaced apart from the second vane by the first pitch, wherein a major portion of a leading edge of the third vane, if located at the baseline position, is visible via a spacing defined between two of the upstream stator vanes when looking in a direction parallel to the central axis, wherein the third vane is circumferentially offset from the baseline position such that the major portion of the leading edge of the third vane is circumferentially overlapped by one of the upstream stator vanes, and wherein lengths of leading edges of the downstream stator vanes circumferentially overlapped by the upstream stator vanes are non-uniform around the central axis.

10. The stator assembly of claim 9, wherein the major portions of the leading edges include at least 50% of spans of the downstream stator vanes.

11. The stator assembly of claim 10, wherein the major portions include tip sections.

12. The stator assembly of claim 10, wherein the major portions are radially-outer portions.

13. The stator assembly of claim 9, wherein all of the downstream stator vanes are identical.

14. The stator assembly of claim 9, wherein a ratio of the first pitch to the second pitch ranges from 1:1 to 1:10.

15. The stator assembly of claim 9, wherein the downstream stator includes baseline vane positions each associated with a respective one of the downstream stator vanes, the downstream stator including zones where major portions of baseline leading edges of the baseline vane positions are visible via spacing defined between the upstream stator vanes, the zones non-uniformly circumferentially distributed around the central axis.

16. The stator assembly of claim 15, wherein the downstream stator vanes located within the zones are separated from each other by the second pitch, the downstream stator vanes located outside the zones being separated from each other by the first pitch.

* * * * *